United States Patent [19]

Lehtomäki et al.

[11] Patent Number: 5,106,640
[45] Date of Patent: Apr. 21, 1992

[54] BETA-GLUCANE ENRICHED ALIMENTARY FIBER AND A PROCESS FOR PREPARING THE SAME

[75] Inventors: Ilkka Lehtomäki; Pertti Karinen, both of Rajamaki; Risto Bergelin, Koskenkorva; Olavi Myllymäki, Espoo, all of Finland

[73] Assignee: Oy Alko AB, Helsinki, Finland

[21] Appl. No.: 461,378

[22] Filed: Jan. 5, 1990

[30] Foreign Application Priority Data

Jan. 6, 1989 [FI] Finland ................................ 890079

[51] Int. Cl.⁵ ................................................ A23J 1/12
[52] U.S. Cl. ...................................... 426/436; 426/482; 426/518; 426/618; 241/9
[58] Field of Search .................. 426/436, 482, 28, 518, 426/618; 241/9

[56] References Cited

U.S. PATENT DOCUMENTS

| | | | |
|---|---|---|---|
| 2,414,117 | 1/1947 | Musher | 426/436 |
| 2,554,873 | 5/1951 | Musher | 426/436 |
| 4,028,468 | 6/1977 | Hohner et al. | 426/436 |
| 4,220,287 | 9/1980 | Boczewski | 241/9 |
| 4,428,967 | 1/1984 | Goering et al. | 426/28 |
| 4,497,840 | 2/1985 | Gould et al. | 426/457 |
| 4,804,545 | 2/1989 | Goering et al. | 426/28 |

FOREIGN PATENT DOCUMENTS 8901294 2/1989 PCT Int'l Appl. .

Primary Examiner—Donald E. Czaja
Assistant Examiner—Mary S. Mims
Attorney, Agent, or Firm—Birch, Stewart, Kolasch & Birch

[57] ABSTRACT

The present invention relates to a beta-glucane enriched grain fiber, and to a process for the preparation of a cellulose-containing, beta-glucane enriched grain fiber, preferably of oats or barley, for use as food or as a raw material or additive in the food industry. In the process, a ground or unground grain such as oats or barley is slurried rapidly in cold water, which may contain an organic solvent. The slurry is homogenized rapidly and is then screened, whereby a beta-glucane containing fiber is obtained.

14 Claims, No Drawings

BETA-GLUCANE ENRICHED ALIMENTARY FIBER AND A PROCESS FOR PREPARING THE SAME

BACKGROUND OF THE INVENTION

1. Field of the Invention

The present invention relates to a beta-glucane enriched grain fiber and to a process for preparing a beta-glucane enriched, cellulose-containing alimentary fiber which is useful as food or as a raw material or additive in the food industry.

2. Description of the Prior Art

Beta-glucane enriched fibers may be prepared in accordance with known processes by grinding the grain while dry and then screening the fiber material from the starch component. The thus obtained fiber material typically contains at most 15% beta-glucane along with a considerable amount of starch. Wet grinding processes have not previously been used except for processing wheat, which contains only very small amounts of beta-glucane (U.S. Pat. No. 3,788,861). These wet grinding processes are not currently being used for grains such as oats or barley because when the grain material becomes wet, enzymes which dissolve beta-glucane are activated and destroy the beta-glucane. In contrast, fiber preparations devoid of beta-glucane are prepared by wet methods. Many processes are known per se for the isolation of beta-glucane. They are characterized by dissolving the beta-glucane, for example, in alkaline conditions and reprecipitating the beta-glucane, for example, with alcohol or acetone. The greatest problem involved in these processes is the high viscosity of the beta-glucane solution even at very low concentrations of beta-glucane. In addition, the precipitation requires a large amount of solvent which has to be recovered and reconcentrated. These problems make such processes uneconomical.

SUMMARY OF THE INVENTION

Accordingly, one object of the present invention is to eliminate the disadvantages described above.

A second object of the present invention is to obtain a novel beta-glucane containing alimentary fiber prepared according to the process described hereinbelow.

A third object of the present invention is to provide a process in which a fiber fraction which contains much beta-glucane and little starch can be prepared from grain, preferably from oats and barley. This fiber fraction, because of its healthful effects, its production-promoting properties in food products and its pleasantly mild taste is suitable for use as food and as a raw material or additive in the food industry.

A fourth object of the present invention is to provide a new type of fiber preparation which contains a large amount of beta-glucane and little starch.

Therefore, a first embodiment of the present invention is related to a process for the preparation of a cellulose-containing, beta-glucane enriched grain, preferably oats or barley, intended for use as food and as a raw material in the food industry. In the process, ground or unground grain such as oats or barley are slurried rapidly in cold water, which may contain an organic solvent. The slurry is homogenized rapidly and screened. A beta-glucane containing fiber is obtained from the screening.

The temperature of the slurrying water is about 0°–15° C., preferably about 8° C. The slurrying water may contain an organic solvent, such as ethanol, which is 5–94% by weight, preferably 20% by weight of the slurrying water. Furthermore, the process is further characterized in that the slurry is homogenized using a wet grinder and that the fiber is separated by screening.

The screening is preferably conducted in two stages. In the first stage, the mesh size is approximately 2000 um, preferably 800 um, and in the second stage the mesh size is approximately 40 um, preferably 80 um.

The invention also relates to beta-glucane enriched grain fibers, preferably of oats or barley, prepared by the processes of the invention described above. The fiber of the invention is intended for use as food or as a raw material or additive in the food industry. The beta-glucane concentration of the fiber according to the present invention is 15–40%, preferably 15–30% and the starch concentration is 5–30%.

DETAILED DESCRIPTION OF THE INVENTION

Grain crops such as oats or barley contain, especially in the seeds, a large amount of beta-glucane combined with a cellulose-containing fiber material.

The invention is based on the basic idea that ground or unground grain such as oats or barley is slurried rapidly in cold water, homogenized rapidly, and the fiber material is then separated by screening. The obtained fiber material is rapidly dried using known drying techniques. What is new and surprising in this process is that, in spite of the use of water, the beta-glucane is not detached from the fiber material and is not destroyed. Moreover, up to 90% of the beta-glucane is recovered in the fiber. The yield can be improved even further by using in the slurrying process, for example, ethanol-containing cold water, since organic solvents have a beta-glucane precipitating effect. The use of organic solvents also enables oils and fats to be isolated from the grain. The endosperm component separated during the screening process may be used, for example, in the preparation of starch, ethanol and protein.

The fiber preparation of the invention is characterized by a beta-glucane content of more than 30%, a very low starch content, and a thickening effect based on the beta-glucane. In foods, this preparation increases the fiber content, decreases the energy content, and the beta-glucane present in the fiber preparation lowers the blood cholesterol level.

According to the invention, ground or unground grain such as oats or barley is slurried rapidly in cold water having a temperature of 0° to 15° C., preferably 8° C. The dry substance content at the slurrying stage is 10–45%, preferably 30%. The slurry is homogenized in an effective wet grinder with as little delay as possible. The homogenized slurry is screened in two stages, the coarser hull and other such material being separated in the first stage and the actual beta-glucane fiber being separated in the second stage. The endosperm component passes both stages. The obtained damp beta-glucane fiber is dried by a known drying method, but it is dried as rapidly as possibly.

If an organic, water-soluble solvent, preferably ethanol, at a concentration of 5–94%, suitably 10–50%, preferably 20%, is used during the slurrying process in addition to cold water, the yield of beta-glucane in the fiber fraction rises as high as 96%. In this case the oils and fats of the grain dissolve in the organic solvent, and they can be separated in a very pure form by removing the organic solvent by evaporation.

The invention is described herein below in detail with the help of some non-limiting examples, the purpose of which is to further illustrate the invention.

EXAMPLE 1

The initial material used was ground barley from which the outer covering of the seed (hull) had been screened off. The flour was slurried in +10° C. water to form an approximately 30% slurry (dry substance content). The slurry was homogenized in a continuous-working wet grinder and screened in a two-stage rotating conical sieve. The mesh size was 800 $\mu$m in the first screening stage and 80 $\mu$m in the second stage. Cold washing water was directed onto the screen surface of the second stage in order to enhance the separation of the endosperm component. In the obtained fine fiber fraction, the beta-glucane concentration was 18% and the starch concentration was 25%. The beta-glucane yield, calculated from the beta-glucane of the initial materials, was approximately 75%.

EXAMPLE 2

The initial material used was dehulled oats. The oats were mixed with cold water and were then fed directly to homogenization. The temperature of the water was +8° C., the dry matter content in the slurring was 20%. The homogenized slurry was screened in a two-stage sieve, as in Example 1. In the obtained fiber fraction the beta-glucane concentration was 31% and the starch concentration was 10%. The beta-glucane yield, calculated from the beta-glucane of the initial material, was approximately 90%.

EXAMPLE 3

The initial material used was ground, dehulled oats. The oats were slurried in an ethanol solution of 16% by weight having a temperature of 12° C. The slurry was homogenized and screened as in Examples 1 and 2.

The beta-glucane concentration of the fiber fraction was 28% and the starch concentration was 12%. The beta-glucane yield was approximately 85%. In addition, the starch and protein were separated by centrifugation from the endosperm slurry which had passed the screening. Ethanol was evaporated out from the supernatant, whereupon the oil of the oats separated in an unoxidized state to the surface.

The invention being thus described, it will be obvious that the same may be varied in may ways. Such variations are not to be regarded as a departure from the spirit and scope of the present invention, and all such modifications as would be obvious to one skilled in the art are intended to be included within the scope of the following claims.

What is claimed is:

1. A process for the preparation of a cellulose-containing, beta-glucane enriched grain fiber, which comprises:
   slurry ground or underground grain rapidly in cold water at a temperature of about 0° to 15° C.,
   homogenizing the slurry rapidly, and
   screening the slurry to obtain a beta-glucane containing fiber.

2. The process of claim 1, wherein the temperature of the cold water is about 8° C.

3. The process of claim wherein homogenizing is conducted with a wet grinder.

4. The process of claim wherein the fiber is separated by screening.

5. The process of claim 1, wherein the screening is conducted in two stages.

6. The process of claim 5, wherein the mesh size in the first stage of screening is approximately 2000 um.

7. The process of claim 5, wherein the mesh size in the first stage of screening is approximately 800 um.

8. The process of claim 5, wherein the mesh size in the second stage of screening is approximately 40 um.

9. The process of claim 5, wherein the mesh size in the second stage of screening is approximately 80 um.

10. The process of claim 1, wherein the ground or unground grain is oats or barley.

11. A process for the preparation of a cellulose-containing, beta-glucane enriched low-starch oat or barley grain fiber, which consists essentially of:
    removing the hull from oat or barley grain to prepare dehulled oat or barley grain;
    rapidly slurrying said de-hulled ground or unground oat or barley grain in a slurrying solution of cold water, the temperature of said slurrying solution being in the range of about 0° to 15° C.;
    homogenizing the slurry rapidly with a wet grinder;
    screening the slurry in a first stage having a mesh size in the range of about 800 to 2000 $\mu$m;
    screening the slurry in a second stage having a mesh size in the range of about 40 to 80 $\mu$m to obtain beta-glucane containing oat or barley grain fibers; and
    rapidly drying the fibers to produce dry fibers containing beta-glucane in a concentration of about 15 to 40% by weight and a starch concentration of 5 to 30% by weight.

12. The process of claim 1, wherein a beta-glucane enriched grain fiber having a beta-glucane concentration of about 15 to 40% by weight and a starch concentration of 5 to 30% by weight is produced.

13. The process of claim 1, wherein at least 75% of the beta-glucane in the grain is recovered.

14. The process of claim 1, wherein between about 75 and about 96% of the beta-glucane in the grain is recovered.

* * * * *